United States Patent
Heidinga et al.

(10) Patent No.: US 11,150,915 B2
(45) Date of Patent: Oct. 19, 2021

(54) DEFERRED BYTECODE CLASS VERIFICATION IN MANAGED RUNTIME ENVIRONMENTS

(71) Applicant: International Business Machines Corporation, Armonk, NY (US)

(72) Inventors: Daniel Heidinga, Ottawa (CA); Sharon Wang, Ottawa (CA); Oluwatobi Adeoye Ajila, Ottawa (CA); Graham Alan Chapman, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/570,475

(22) Filed: Sep. 13, 2019

(65) Prior Publication Data
US 2021/0081220 A1    Mar. 18, 2021

(51) Int. Cl.
*G06F 9/44* (2018.01)
*G06F 9/445* (2018.01)

(52) U.S. Cl.
CPC ................. *G06F 9/44589* (2013.01)

(58) Field of Classification Search
CPC .................................................. G06F 9/44589
See application file for complete search history.

(56) References Cited

U.S. PATENT DOCUMENTS

| | | | | |
|---|---|---|---|---|
| 6,601,114 B1* | 7/2003 | Bracha | ................ | G06F 9/44521 719/332 |
| 6,618,769 B1* | 9/2003 | Bracha | ................ | G06F 9/44521 717/165 |
| 6,618,855 B1* | 9/2003 | Lindholm | ........... | G06F 9/44589 713/176 |
| 7,316,010 B1* | 1/2008 | Daynes | ................... | G06F 9/445 717/140 |
| 7,526,760 B1* | 4/2009 | Daynes | ................... | G06F 9/449 717/153 |
| 8,082,542 B2 | 12/2011 | Bottomley et al. | | |
| 8,533,687 B1* | 9/2013 | Greifeneder | ........ | G06F 11/3495 717/130 |
| 8,769,518 B1* | 7/2014 | Daudel | ................... | G06F 9/445 717/166 |

(Continued)

FOREIGN PATENT DOCUMENTS

JP         2000039997 A      2/2000

OTHER PUBLICATIONS

Coglio, Checking Access to Protected Members in the Java Virtual Machine, ETH Zurich, Chair of Software Engineering, Journal of Object Technology, vol. 4, No. 8, 2005.

(Continued)

*Primary Examiner* — Hang Pan
(74) *Attorney, Agent, or Firm* — Garg Law Firm, PLLC; Rakesh Garg; Michael O'Keefe

(57) ABSTRACT

During verification of a bytecode, when a second class remains to be loaded for verification in an MRE, a verifier in the MRE is prevented from loading the second class, where the bytecode includes a relationship between a first class and the second class. The relationship is recorded and the verifier is caused to omit a loading operation on the second class. An execution is started of an application encoded in the bytecode. The second class is caused to be loaded and verified prior to a use of the second class during the execution.

20 Claims, 6 Drawing Sheets

(56) References Cited

U.S. PATENT DOCUMENTS

| | | | |
|---|---|---|---|
| 9,213,826 B2 | 12/2015 | Gu et al. | |
| 9,250,938 B2 | 2/2016 | Herring et al. | |
| 10,255,062 B1 | 4/2019 | Beranek et al. | |
| 2005/0091650 A1 | 4/2005 | Heeb | |
| 2006/0070051 A1 | 3/2006 | Kuck et al. | |
| 2006/0161896 A1 | 7/2006 | Hicks et al. | |
| 2007/0169072 A1 | 7/2007 | Corrie | |
| 2008/0271002 A1 | 10/2008 | Susarla et al. | |
| 2009/0031202 A1* | 1/2009 | Branda | G06F 11/1004 714/807 |
| 2009/0217022 A1 | 8/2009 | Chi et al. | |
| 2010/0199259 A1* | 8/2010 | Quinn | G06F 9/44521 717/106 |
| 2010/0306742 A1 | 12/2010 | Schneider | |
| 2012/0169729 A1* | 7/2012 | Yamaji | H04N 13/156 345/419 |
| 2013/0145348 A1* | 6/2013 | Agovic | G06F 8/34 717/120 |
| 2013/0212567 A1 | 8/2013 | Fisher et al. | |
| 2014/0351802 A1 | 11/2014 | Eliás et al. | |
| 2015/0317167 A1 | 11/2015 | Zhou et al. | |
| 2016/0062878 A1 | 3/2016 | Westrelin et al. | |
| 2017/0249252 A1 | 8/2017 | Elias et al. | |
| 2018/0129684 A1* | 5/2018 | Wilson | G06F 16/211 |
| 2018/0373545 A1 | 12/2018 | Daudel et al. | |
| 2019/0215394 A1 | 7/2019 | Torvinen et al. | |
| 2020/0004508 A1 | 1/2020 | Zhou et al. | |

OTHER PUBLICATIONS

Leroy, Java Bytecode Verification: Algorithms and Formalizations, Journal of Automated Reasoning 30: 235-269, 2003.

Evans, "Real-World Bytecode Handling with ASM", Java Magazine, Aug. 1, 2018, 11 pages, https:/lblogs.oracle.com/javamagazine/real-world-bytecode-handling-with-asm.

Kuhn, "Bytecode Verification and Security", 2000-2001, 1 page, https:/lblogs.oracle.com/javamagazine/real-world-bytecode-handling-with-asm.

Horstmann et al., "Core Java Security: Class Loaders, Security Managers, and Encryption", Pearson, Apr. 16, 2008, www.informit.com/articles/article.aspx?p=1187967&seqNum=2, 5 pages.

Horstmann et al., "Core Java Security: Class Loaders, Security Managers, and Encryption", Pearson, Apr. 16, 2008, www.informit.com/articles/article.aspx?p=1187967, 10 pages.

List of all IBM related dockets, Appendix P, 2019.

Leroy, "Java Bytecode Verification: Algorithms and Formalizations", https://link.springer.com/article/10.1023/A:1025055424017, Springer Link, May 2003, vol. 30, Issue 3—4, 35 pages.

Coglio, "Checking Access to Protected Members in the Java Virtual Machine", http://www.jot.fm/issues/issue_2005_10/article3.pdf, Journal of Object Technology, 2005, vol. 4 No. 8, 22 pages.

Evans, "Real-World Bytecode Handling with ASM", https://blogs.oracle.com/javamagazine/real-world-bytecode-handling-with-asm, Java magazine, Aug. 1, 2018, 11 pages.

Kuhn, "Bytecode Verification and Security", http://www.ebb.org/bkuhn/articles/thesis/node8.html, 2000-2001, 1 page.

Horstmann et al., "Core Java Security: Class Loaders, Security Managers, and Encryption", http://www.informit.com/articles/article.aspx?p=1187967, Pearson, Apr. 16, 2008, 10 pages.

Horstmann et al., "Core Java Security: Class Loaders, Security Managers, and Encryption; Bytecode Verification", http://http://www.informit.com/articles/article.aspx?p=1187967&seqNum=2, Pearson, Apr. 16, 2008, 5 pages.

U.S. Appl. No. 16/694,257, filed Nov. 25, 2019, Non-Final rejection date: Mar. 30, 2021.

* cited by examiner

… (1)

DEFERRED BYTECODE CLASS VERIFICATION IN MANAGED RUNTIME ENVIRONMENTS

TECHNICAL FIELD

The present invention relates generally to a method, system, and computer program product for optimizing verification of bytecode by delaying class loading. More particularly, the present invention relates to a method, system, and computer program product for deferred bytecode class verification in managed runtime environments.

BACKGROUND

A programming language used by programmers to code instructions is commonly known as a high level language. High level instructions are computer instructions coded in a high level language. Source code is high level code comprising high level instructions. A compiler compiles source code into bytecode.

Bytecode is a set of low level instructions. A low level instruction is an instruction that is consumable for performing an operation, or otherwise understood and usable by an interpreter. Compilers and interpreters are software tools used in the process of preparing a source code for execution on data processing hardware under the control of an operating system.

In some cases, as in the case of Java or C#, bytecode can be executed or interpreted by a virtual machine such as Java Virtual Machine (JVM). (Java, Java Virtual Machine, and JVM are trademarks owned by Oracle Corporation. C# is a mark owned by Microsoft Corporation). In other cases, bytecode is further transformed into machine code. A processor understands and executes machine code.

A runtime environment is a data processing environment in which bytecode or machine code interacts with hardware components such as processor and memory to perform desired operations encoded in the source code. A managed runtime environment (MRE) (also interchangeably referred to herein as "managed runtime") is a virtualized data processing system, virtualized data processing environment, or virtual machine, e.g., JVM, which executes, operates, or interprets bytecode.

SUMMARY

The illustrative embodiments provide a method, system, and computer program product. An embodiment includes preventing, during verification of a bytecode, responsive to a second class remaining to be loaded for verification in an MRE, a verifier in the MRE from loading the second class, wherein the bytecode includes a relationship between a first class and the second class. The embodiment further includes recording the relationship. The embodiment further includes causing the verifier to omit a loading operation required to validate the relationship between the two classes. The embodiment further includes triggering an execution of an application encoded in the bytecode. The embodiment further includes causing the second class to be loaded and verified prior to a use of the second class during the execution, including checking all the recorded relationships hold.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
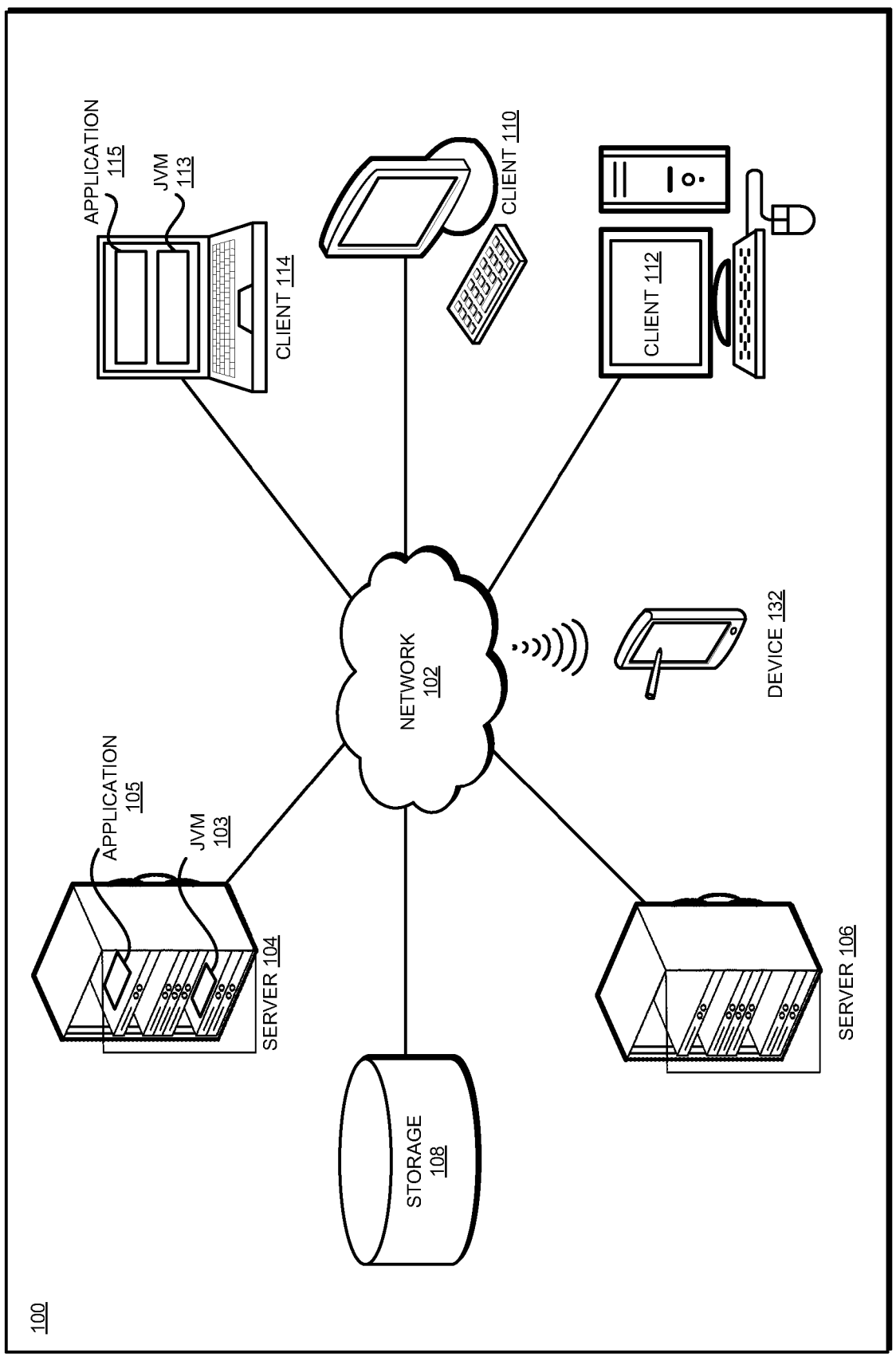
FIG. 1 depicts a block diagram of a network of data processing systems in which illustrative embodiments may be implemented.

The terms "verification" and "validation" are used interchangeably herein except where expressly distinguished. Java as a source code language and an MRE including JVM are used herein as examples to describe and illustrate the various embodiments with clarity. These examples of the particular language or MRE are not intended to be limiting. From this disclosure, those of ordinary skill in the art will be able to conceive many other languages and MREs to which an embodiment is either applicable or adaptable, and the same are contemplated within the scope of the illustrative embodiments.

Managed runtime environment and bytecode generation and use are well recognized technological fields of endeavor. The present state of the technology in these fields of endeavor has certain drawbacks and limitations. The operations and/or configurations of the illustrative embodiments impart additional or new capabilities to improve the existing technology in the technological field of endeavor of managed runtime environment and bytecode generation and use, especially in the area of verification of bytecode prior to execution in order to avoid unsafe bytecode, bytecode from operating on the incorrect types, malformed bytecode, or improperly configured bytecode from executing and causing system disruption.

The illustrative embodiments recognize that Java, and many other managed runtimes, require compiled bytecode to be verified before being loaded to ensure that invariants in the specification are not violated. This verification process ensures that all the code being run is well formed and safe to be run in that it will not cause the virtual machine to crash, corrupt memory, or operate incorrectly.

In JVM, verification validates that the execution stack is well formed. The verification confirms that the stack has the same shape at the start of any basic block (jump target), no overflows or underflows occur, the types of arguments and returns are compatible, assignments to variables and fields have the right type, and other functions directed towards similar purposes.

The presently available verifier in an MRE performs these types of compatibility checks by loading each class encountered in the bytecode when the names are not identical, and checking the relationships between the loaded classes at points where the verifier needs to merge stack shapes, such as at method calls. As a part of this process, the presently available verifier loads each source (i.e., a starting class), checking either (i) that a target (i.e. an ending class) is a superclass of the source, or (ii) that the target is an interface regardless of whether the source implements it as an interface.

The illustrative embodiments recognize that this method of verification operates to cause inefficiencies in application execution. As described earlier, the verification loads each class encountered in the bytecode. During application startup, this manner of loading each class for verification can result in many classes being loaded, even if those classes will never be used by the current application. For example, the application may have built in exception conditions and classes to handle those exception conditions, but such a class might not be used if that exception is not thrown during execution. Similarly, a class may implement a method which is of rare utility and the method may not be called during normal execution, if ever. Nonetheless, the presently available method of bytecode verification requires that such classes be first loaded so that the relationships of the class can be verified.

The illustrative embodiments recognize that each class that has to be loaded slows down JVM startup and delays getting to execute the bytecode. The illustrative embodiments recognize that the class relationships can be checked lazily by only recording the class relationships and not actually checking the relationships by loading the classes, and then using the recorded relationship to perform the validation when loading of a class is actually required. Thus, the illustrative embodiments recognize that the relationship recording can be performed when the class relationship is encountered, but the class loading and verification of the relationships can be deferred to sometime before the class has to be actually made available for use during the application execution. For example, if a particular exception was needed to be thrown during runtime, an embodiment loads and verifies the class that implements the exception.

Such an operation of an embodiment speeds up the application startup and execution by deferring the loading of many classes, unless a class that is encountered in a relationship has already been loaded previously for some other reason. If a class used in a relationship is already loaded, an embodiment allows the verification to proceed according to a presently available verification method.

The present state of the technological field of endeavor of bytecode verification in MREs presently does not include a mechanism, other than loading each class at verification prior to application startup, to avoid verification related delays. A need exists for improving the startup speed of bytecode execution. A need exists that class verification be performed on a deferred basis, especially for, but not limited to, the classes that are referenced in the bytecode but may or may not be used in the execution.

The illustrative embodiments recognize that the presently available tools or solutions do not address these needs/problems or provide adequate solutions for these needs/problems. The illustrative embodiments used to describe the invention generally address and solve the above-described problems and other related problems by deferred class loading and bytecode class verification in managed runtime environments.

An embodiment can be implemented as a combination of certain hardware components and a software application. An implementation of an embodiment, or one or more components thereof, can be configured as a modification of an existing MRE, with a companion software application executing in some combination of (i) the MRE itself, (ii) a data processing system communicating with the MRE over short-range radio or a local area network (LAN), and (iii) a data processing system communicating with the MRE over a wide area network (WAN).

An embodiment allows a verifier in an MRE to proceed normally up to the point after the verifier has identified a relationship between a first class and a second class. The embodiment intercepts the verification process at this point where the verifier has determined that at least one of the classes is not yet loaded for verification of the relationship. At the point of interception, and without allowing the verifier to load the class, the embodiment determines whether the class is already loaded. If both classes are already loaded, the embodiment allows the verifier to proceed normally as in the presently available verifiers, and verify the relationship between the classes because no additional loading operation has to be performed which can be saved or deferred by the embodiment.

In one embodiment, the first class is already loaded and the second class is not already loaded at the point of interception. In another embodiment, first class is not already loaded and the second class is not already loaded at the point of interception. In either of these two cases, an embodiment prevents the loading of a not yet loaded class, records the relationship between the first class and the second class in the class loader's class relationship table. The embodiment returns to the verifier for continuing the verification process.

For example, when a class (e.g., the source class) is being loaded, an embodiment checks whether there are any relationship constraints on the source class in the current loader. For each relationship that is asserted, the embodiment checks whether the target class has already been loaded. If the target class is loaded, then the embodiment allows the verifier to check that the source class is assignable to the target class. If the target class is not yet loaded, then the embodiment registers a new relationship which asserts that the target must be an interface type and allows the verifier to proceed to a next source class, or to another relationship of the source class with a different target class.

In one specific example implementation of an embodiment in a Java-based MRE, a source class is assignable to a target class when the target is a superclass or superinterface of the source class, or due to the special type-checking rules of the verifier, that the target is any interface. In this implementation, the embodiment records the relationship that indicates the target class as an interface. This constraint of recording the target as an interface leverages two facts of the Java based implementation—Java verifier's type checking rules allow anything to be passed as an interface, and the JVM rule that states that superclasses and superinterfaces must be loaded before their children classes and interfaces.

This process of an embodiment allows class loading to be delayed or deferred until the class use would naturally arise in the application's execution. In one embodiment, for correctness, the relationship verification process of the embodiment also checks the class loader constraints so as to prevent invalid classes from being loaded.

When, during execution a class is needed, and that class is a class whose verification was deferred until actual use, an embodiment loads the class and allows a verification process to verify the class—at runtime, after the startup of the execution of the application, during execution of the application, and only when the class is actually needed in the execution.

The manner of deferred bytecode class verification in managed runtime environments described herein is unavailable in the presently available methods in the technological field of endeavor pertaining to bytecode verification in MREs. A method of an embodiment described herein, when implemented to execute on a device or data processing system, comprises substantial advancement of the functionality of that device or data processing system in speeding up application startup, reducing startup latency, compacting the memory occupied by loaded classes at startup, or some combination thereof.

The illustrative embodiments are described with respect to certain types of languages, code, bytecode, runtime environments, MREs, timing, tables, records, relationships, classes, verifications, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
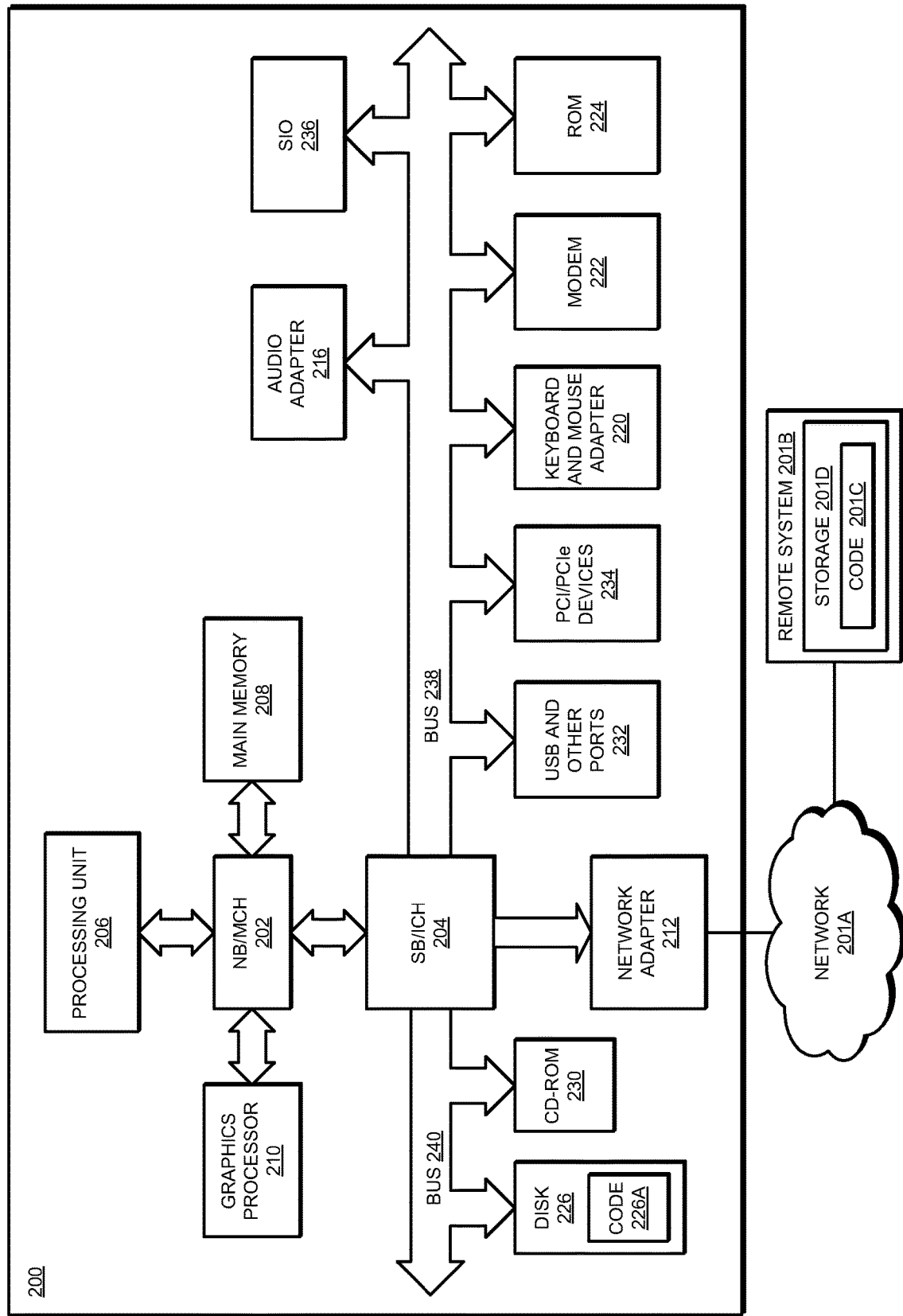
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment and operates in conjunction with an MRE, such as JVM 103. Application 105 and MRE 103 operate together as described herein when the embodiment is implemented on a server, such as on server 104. Application 115 implements an embodiment and operates in conjunction with an MRE, such as JVM 113. Application 115 and MRE 113 operate together as described herein when the embodiment is implemented on a client, such as on client 114. Components of application 105 and or 115 can be distributed across more than one system within the scope of illustrative embodiments.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 or application 115 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
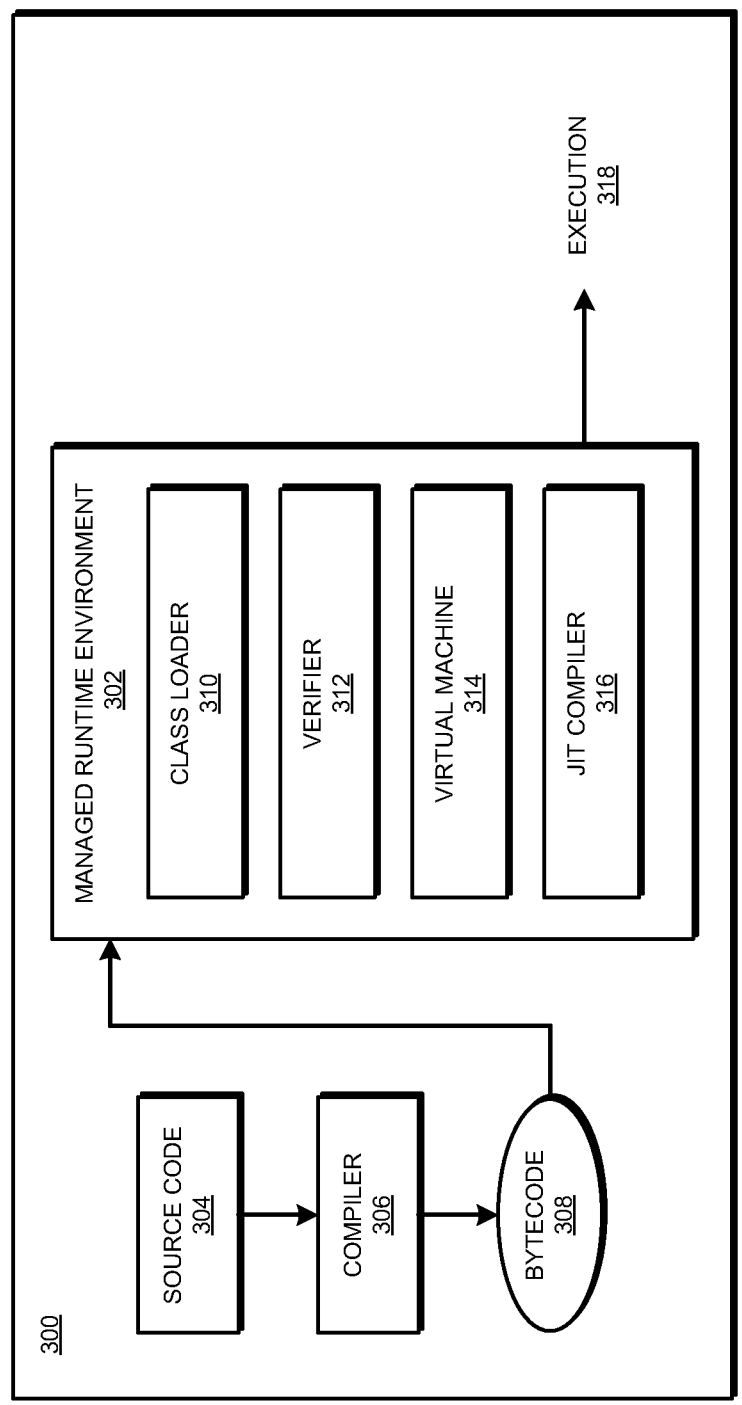
FIG. 3 depicts a block diagram of an example configuration in which an illustrative embodiment can be implemented.

With reference to FIG. 3, this figure depicts a block diagram of an example configuration in which an illustrative embodiment can be implemented. Configuration 300 depicts an example MRE 302. Source code 304 is a high level language input source code as described herein. Compiler 306 performs lightweight compilation on source code 304 in a non-platform specific manner to produce bytecode 308.

Class loader 310 loads a class based on a relationship identified in bytecode 308. Verifier 312 performs a presently available verification function as described herein. Virtual machine (VM) 314 interprets or executes bytecode as appropriate according to the nature and language of source code. JVM is an example of VM 314. In case of Java code forming source code 304, JVM 314 performs execution 318 of the application encoded in source code 304.

In cases where further compilation is needed to produce machine code from bytecode 308, compiler 316 performs such compilation functions and produces machine code (not shown). The machine code is executed by a processor in execution 318.

Figure 4:
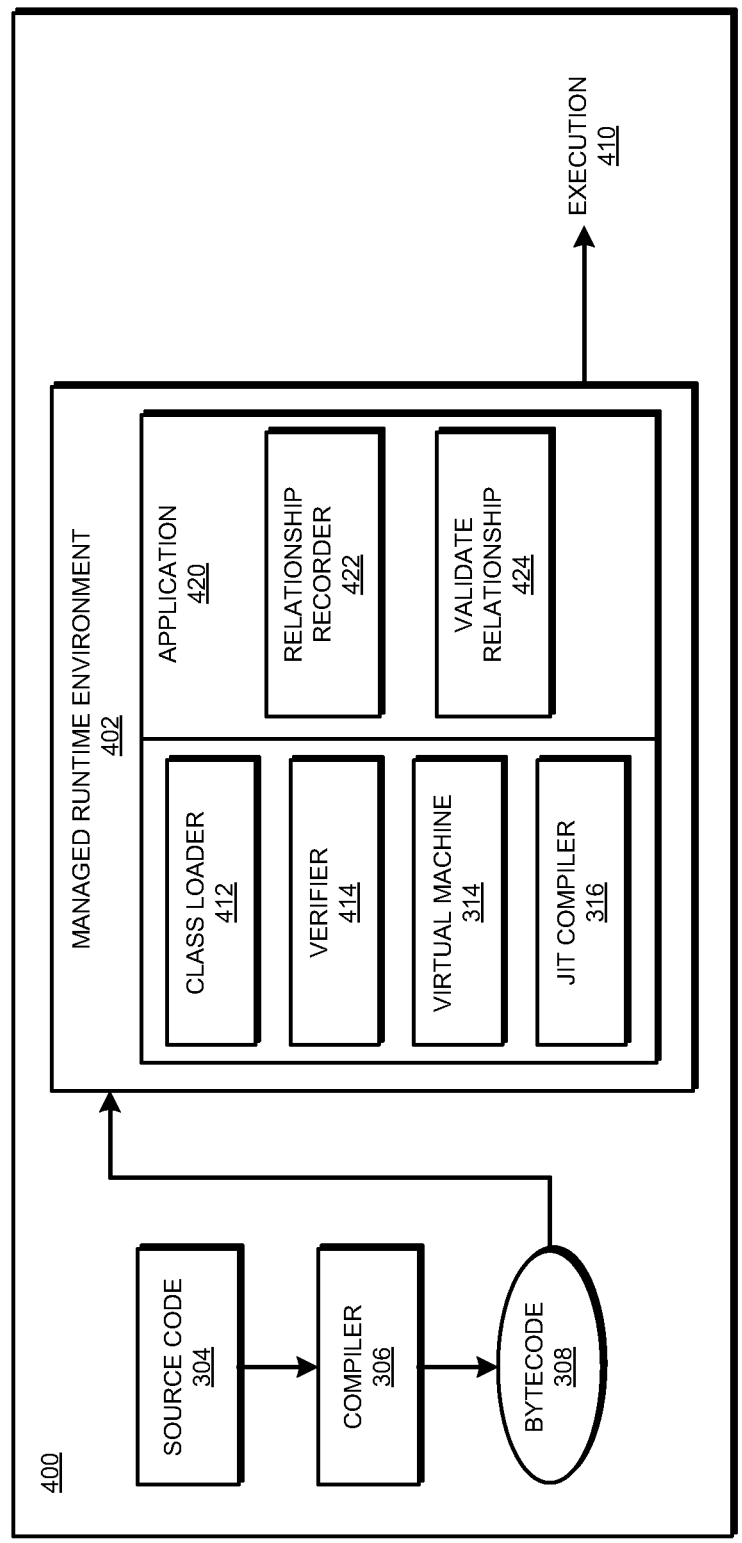
FIG. 4 depicts a block diagram of an improved configuration for deferred bytecode class verification in managed runtime environments in accordance with an illustrative embodiment.

With reference to FIG. 4, this figure depicts a block diagram of an improved configuration for deferred bytecode class verification in managed runtime environments in accordance with an illustrative embodiment. Configuration 400 depicts MRE 402 in which application 420 operates in conjunction with the components described in FIG. 3. Application 420 is an example of application 105, application 115, or some combination thereof depending on the specific implementation. Common reference numbers between FIGS. 3 and 4 refer to the same artifacts as described with respect to FIG. 3.

Class loader 412 is a modified form of class loader 312 in that in some implementations, application 420 interfaces with class loader 412 such that the relationship verification process of the embodiment also checks the class loader constraints so as to prevent invalid classes from being loaded. In other implementations, class loader 312 can be used in place of class loader 412 when an embodiment that does not check for class loader constraints is implemented.

Verifier 414 is a modified form of verifier 312 in that application 420 interfaces with verifier 414 to perform an operation described herein. Specifically, when verifier 414 identifies a relationship for verification, and when at least one of the classes in a relationship is not already loaded, verifier 414 passes the relationship information to relationship recorder component 422 in application 420. Relationship recorder 422 records the relationship—e.g., by identifying the source class and the target class of the relationship in a class relationship table. Each of the classes recorded in the class relationship table are unique within the scope of the bytecode. Relationship recorder 422 passes the control back to verifier 414 such that verifier 414 progresses the verification process to a next relationship without loading the class that is not loaded from the relationship. When verifier 414 identifies a relationship for verification, and when both classes in a relationship are already loaded, verifier 414 operates in the manner of verifier 312 and performs the verification operation using the loaded classes.

During runtime, when an as-yet-not-loaded class is called, needed, required to be available, validate relationship component 424 looks up the relationship record created by component 422, causes verifier 414 to load the as-yet-not-loaded class to be loaded and verified, and VM 314 to continue the execution with the newly loaded class. For maintaining the continuity of execution, in one embodiment, validate relationship component 424 looks up the relationship record created by component 422, causes verifier 414 to load the as-yet-not-loaded class to be loaded and verified some time before the as-yet-not-loaded class is called, needed, required to be available.

Figure 5:
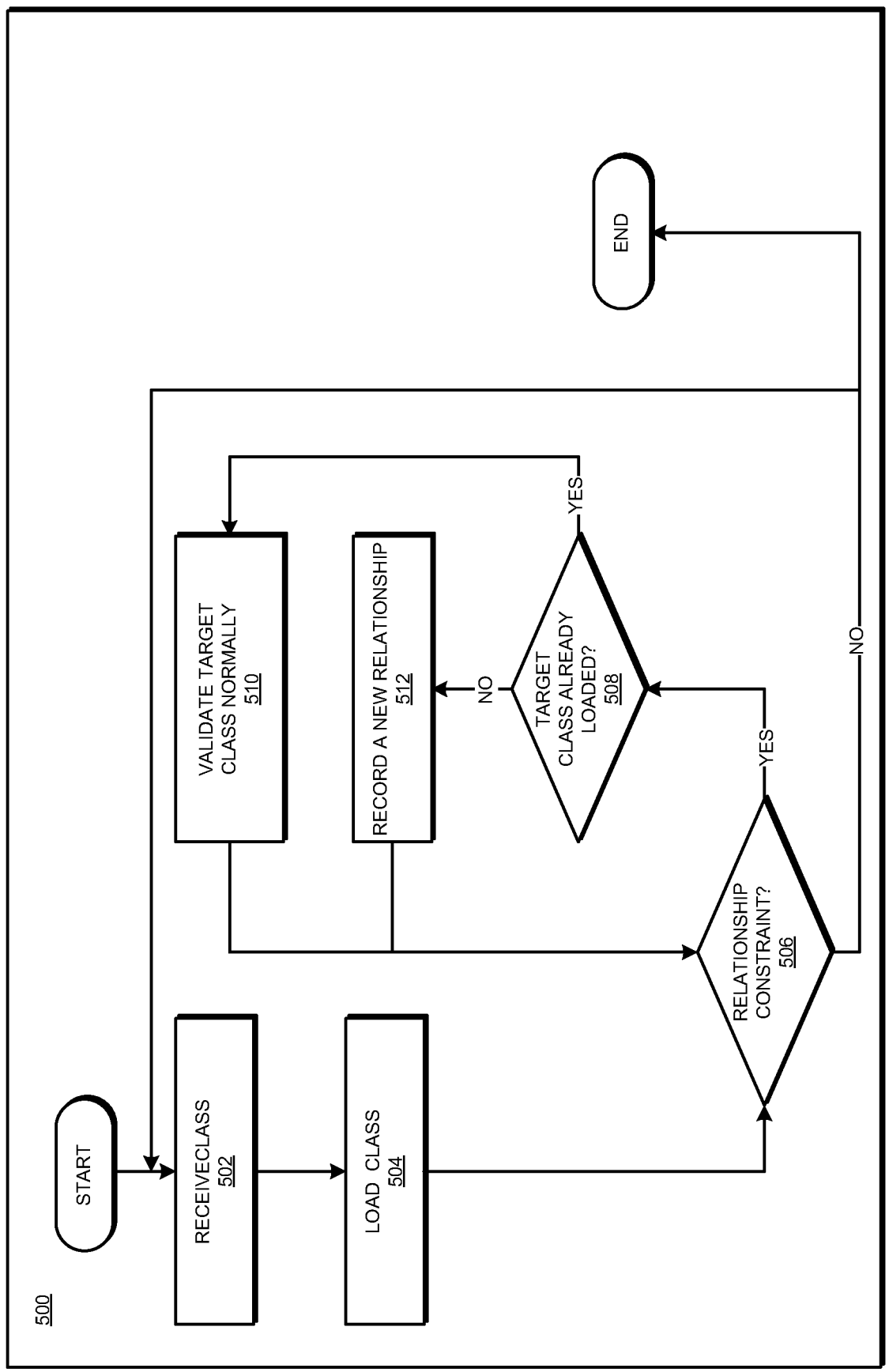
FIG. 5 depicts a flowchart of an example process for deferred bytecode class verification in managed runtime environments in accordance with an illustrative embodiment.

With reference to FIG. 5, this figure depicts a flowchart of an example process for deferred bytecode class verification in managed runtime environments in accordance with an illustrative embodiment. Process 500 can be implemented in application 420 in FIG. 4.

The application receives, or causes to be received, a class to be loaded in an MRE (block 502). The application causes the class to be verified in the MRE (block 504). During verification, there are points that require determining whether the types on the stack are compatible with those expected at the branch target, method send, field access, etc. The verifier attempts to determine whether a relationship constraint remains to be processed for the two classes: source class (block 506) and target class. If a relationship constraint is to be processed for the source class ("Yes" path of block 506), the application determines whether a second class—e.g., a target class—according to the relationship constraint is already loaded (block 508).

If a target class according to the relationship constraint is already loaded ("Yes" path of block 508), the application validates, or causes to be validated, the loaded target class in a normal manner of validation in the MRE (block 510). The application then returns to block 506. If a target class according to the relationship constraint is not already loaded ("No" path of block 508), the application records, or causes to be recorded, the relationship as a new relationship record (block 512). The application then returns to block 506.

If no more relationship constraint is to be processed for the source class ("No" path of block 506), verification completes for the relationship and the application allows the verification to either continue with another relationship or ends process 500 thereafter.

Figure 6:
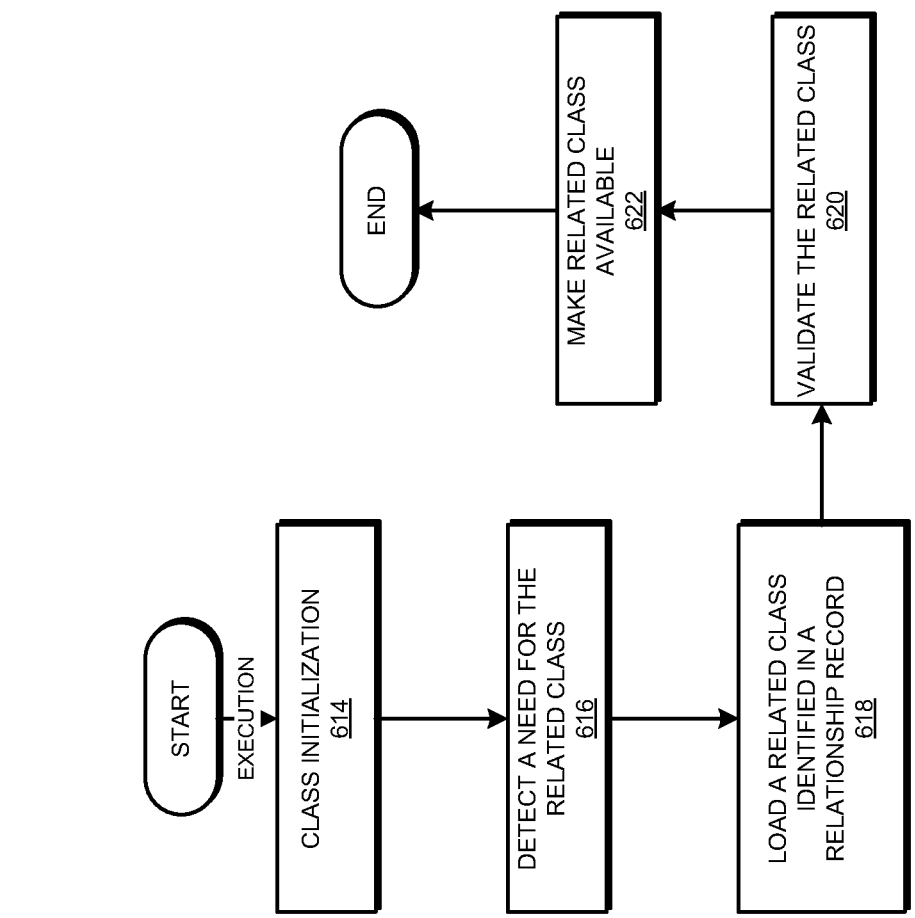
FIG. 6, this figure depicts a flowchart of a delayed class loading process in accordance with an illustrative embodiment.

With reference to FIG. 6, this figure depicts a flowchart of a delayed class loading process in accordance with an illustrative embodiment. Process 600 can be implemented using application 420 in an MRE.

The application initializes, or causes to be initialized, a loaded class (block 614). During execution, the application detects, or causes to be detected, a need for the as-yet-not-loaded class (block 616). The application loads, or causes to be loaded, the as-yet-not-loaded class (block 618). The application validates, or causes to be validated, the as-yet-not-loaded class (block 620). The application makes available, or causes to be made available, the newly loaded class in the MRE (block 622). The application ends process 600 thereafter.

Thus, a computer implemented method, system or apparatus, and computer program product are provided in the illustrative embodiments for deferred bytecode class verification in managed runtime environments and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A method comprising:
preventing, during verification of a bytecode, responsive to a second class remaining to be loaded for verification in a Managed Runtime Environment (MRE), a verifier in the MRE from loading the second class, wherein the bytecode includes a relationship between a first class and the second class and wherein the first class is a source class, and wherein the second class is a target class;
recording the relationship between the first class and the second class, responsive to the preventing, using a class relationship table without a class loading step;
causing the verifier to omit a loading operation on the second class;
triggering an execution of an application encoded in the bytecode;
causing the second class to be loaded and verified using the recorded relationship prior to a use of the second class during the execution;
wherein the relationship between the first class and the second class in the bytecode is identified using the verifier in the MRE, and wherein the verification of the bytecode is intercepted at a point where the verifier is verifying the relationship, the preventing being responsive to the verification being intercepted.

2. The method of claim 1, further comprising:
detecting, during the execution that the execution has reached an execution point where the second class has to be available, wherein the causing the second class to be loaded is responsive to the execution reaching the execution point.

3. The method of claim 2, wherein the execution point is prior to a second execution point where the second class is called in the execution.

4. The method of claim 1, further comprising:
preventing, during verification of the bytecode, responsive to a fourth class remaining to be loaded for verification in the MRE, the verifier in the MRE from loading the fourth class, wherein the bytecode includes a second relationship between a third class and the fourth class;
recording the second relationship;
causing the verifier to omit a second loading operation on the fourth class; and
avoiding, for an entirety of the execution, loading the fourth class regardless of the second relationship existing in the bytecode between the third class and the fourth class.

5. The method of claim 1, further comprising:
determining that the first class is also remaining to be loaded during the verification of the bytecode, wherein the preventing is further responsive to determining that the first class is also remaining to be loaded during the verification of the bytecode.

6. The method of claim 1, further comprising:
adding, as a part of the recording, the class relationship table, a new record comprising a first identifier of the first class and a second identifier of the second class.

7. The method of claim 6, wherein the second identifier of the second class is unique within the bytecode.

8. The method of claim 1, further comprising:
causing the verifier to further omit a verification operation on the second class.

9. The method of claim 1, further comprising:
allowing, responsive to causing the verifier to omit, the verifier to process a next relationship in the bytecode.

10. A computer usable program product comprising a computer-readable storage device, and program instructions stored on the storage device, the stored program instructions when executed by a processor causing operations, the operations comprising:
preventing, during verification of a bytecode, responsive to a second class remaining to be loaded for verification in a Managed Runtime Environment (MRE), a verifier in the MRE from loading the second class, wherein the bytecode includes a relationship between a first class and the second class and wherein the first class is a source class, and wherein the second class is a target class;
recording the relationship between the first class and the second class, responsive to the preventing, using a class relationship table without a class loading step;
causing the verifier to omit a loading operation on the second class;
triggering an execution of an application encoded in the bytecode; and
causing the second class to be loaded and verified using the recorded relationship prior to a use of the second class during the execution;
wherein the relationship between the first class and the second class in the bytecode is identified using the verifier in the MRE, and wherein the verification of the bytecode is intercepted at a point where the verifier is verifying the relationship, the preventing being responsive to the verification being intercepted.

11. The computer usable program product of claim 10, further comprising:
detecting, during the execution that the execution has reached an execution point where the second class has to be available, wherein the causing the second class to be loaded is responsive to the execution reaching the execution point.

12. The computer usable program product of claim 11, wherein the execution point is prior to a second execution point where the second class is called in the execution.

13. The computer usable program product of claim 10, further comprising:
preventing, during verification of the bytecode, responsive to a fourth class remaining to be loaded for verification in the MRE, the verifier in the MRE from loading the fourth class, wherein the bytecode includes a second relationship between a third class and the fourth class;
recording the second relationship;
causing the verifier to omit a second loading operation on the fourth class; and
avoiding, for an entirety of the execution, loading the fourth class regardless of the second relationship existing in the bytecode between the third class and the fourth class.

14. The computer usable program product of claim 10, wherein the stored program instructions are stored in a computer readable storage device in a data processing system, and wherein the stored program instructions are transferred over a network from a remote data processing system.

15. The computer usable program product of claim 10, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

16. A computer system comprising a processor, a computer-readable memory, and a computer-readable storage device, and program instructions stored on the storage device for execution by the processor via the memory, the stored program instructions comprising:
program instructions to preventing, during verification of a bytecode, responsive to a second class remaining to be loaded for verification in a Managed Runtime Environment (MRE), a verifier in the MRE from loading the second class, wherein the bytecode includes a relationship between a first class and the second class and wherein the first class is a source class, and wherein the second class is a target class;
program instructions to record the relationship between the first class and the second class, responsive to the preventing, using a class relationship table without a class loading step;
program instructions to cause the verifier to omit a loading operation on the second class;
program instructions to trigger an execution of an application encoded in the bytecode; and
program instructions to cause the second class to be loaded and verified using the recorded relationship prior to a use of the second class during the execution;
wherein the relationship between the first class and the second class in the bytecode is identified using the verifier in the MRE, and wherein the verification of the bytecode is intercepted at a point where the verifier is verifying the relationship, the preventing being responsive to the verification being intercepted.

17. The computer system of claim 16, further comprising:
program instructions to detect, during the execution that the execution has reached an execution point where the second class has to be available, wherein the causing the second class to be loaded is responsive to the execution reaching the execution point.

18. The computer system of claim 16, wherein the execution point is prior to a second execution point where the second class is called in the execution.

19. The computer system of claim 16, further comprising:
program instructions to prevent, during verification of the bytecode, responsive to a fourth class remaining to be loaded for verification in the MRE, the verifier in the MRE from loading the fourth class, wherein the bytecode includes a second relationship between a third class and the fourth class;
program instructions to record the second relationship;
program instructions to cause the verifier to omit a second loading operation on the fourth class; and program instructions to avoid, for an entirety of the execution, loading the fourth class regardless of the second relationship existing in the bytecode between the third class and the fourth class.

20. The computer system of claim 16, further comprising:
program instructions to determine that the first class is also remaining to be loaded during the verification of the bytecode, wherein the preventing is further responsive to determining that the first class is also remaining to be loaded during the verification of the bytecode.

* * * * *